Patented May 11, 1948

2,441,231

UNITED STATES PATENT OFFICE 2,441,231

STABILIZED ABIETYL MATERIALS AND PROCESS FOR MAKING THE SAME

Seymour Yolles, Providence, R. I., assignor to Ridbo Laboratories, Inc., Paterson, N. J., a corporation of New Jersey No Drawing. Application January 14, 1944, Serial No. 518,254

15 Claims. (Cl. 260—97)

This invention relates to an improved composite abietyl or rosin material having increased resistance to oxidation.

As is well known, various abietyl compounds, such as gum and wood rosins, rosin esters, rosin salts and other derivatives, are advantageous materials for many purposes but are subject to the serious drawbacks of being unstable and readily oxidizable. In addition liquid derivatives are also subject to rather rapid embrittlement.

To overcome the foregoing drawbacks, which are highly disadvantageous for many purposes for which abietyl compounds are otherwise well suited, it has been proposed either to treat the material in a manner to increase its stability, or to add to the material some anti-oxidant tending to inhibit oxidation. Examples of the first expedient are treatments for hydrogenating and treatments for disproportionating the rosin or other abietyl compound. As examples of the second expedient (anti-oxidants) it may be mentioned that a number of different agents have been tried for this purpose, including amines or phenols of various types.

Various of the foregoing treatments and also various of the proposed anti-oxidants have at least in part increased the stability of abietyl compounds, but both of these expedients are subject to disadvantages, some of which are mentioned just below.

In the case of treatment of the rosin or other abietyl compound to increase its stability, the treatment process has frequently been relatively expensive or complicated, frequently requiring the employment of expensive agents and/or catalysts and/or equipment. On the other hand various of the anti-oxidants which have been proposed have been subject to the disadvantage that the anti-oxidant itself frequently yields dark colored reaction products upon aging or when exposed to oxidizing influences, thereby impairing the quality of the product. In addition, the anti-oxidants heretofore proposed for use have customarily been of chemical composition quite different from the abietyl compound being stabilized, as a result of which the antioxidant may, in a sense, be considered as an impurity.

I have discovered that a composite abietyl material which has enhanced resistance to oxidation may be prepared by mixing with a given abietyl compound to be stabilized, a minor proportion of another abietyl compound, which latter is itself highly stable as against oxidation. In this way even very small percentages, such as 5%, of a stabilized rosin, when added to an unstable commercial rosin, will increase the stability of the rosin to a degree far in excess of that to be expected from the addition of such small quantities of the stabilized material.

Most advantageously, according to the invention, the stabilized abietyl compound to be added is of the same basic composition or structure as the material to which it is to be added. To illustrate, it is preferred in the case of rosins, to add a small percentage of a stabilized rosin; and in the case of a rosin ester to add a small percentage of a stabilized rosin ester. In this way, in the case of an acidic rosin material, the desired general physical properties of the material are not impaired as they would be in the event, for instance, of adding a small percentage of a stabilized ester to an acidic rosin material. Correspondingly, where a rosin ester of increased stability is desired as the final product, the desired ester content is maintained when adding a small percentage of a stabilized ester, whereas the ester content would be somewhat impaired if a stabilized acidic rosin material were to be added to an ester.

It is here pointed out that the characteristic instability and ready oxidizability of most abietyl compounds is commonly considered to result from the relatively high unsaturation which such compounds manifest. The abietyl molecule comprises a hydrophenanthrene nucleus usually incorporating two double bonds, which is the source of the high unsaturation. This characteristic unsaturation is present not only in rosin acids and commercial rosins, such as gum and wood rosins, but also in derivatives of various types, such as esters and salts made from the acidic rosin material.

The invention is applicable to many different rosin or abietyl compounds, such, for instance, as gum or wood rosins, rosin acids, such as abietic acid, rosin esters made with various monohydric and polyhydric alcohols, rosin salts of inorganic and organic monovalent and polyvalent cations, rosin alcohols, the esters of rosin alcohols, and in general, compounds containing the abietyl nucleus and sufficient unsaturation to be easily oxidizable.

Although, as above indicated, the invention is adapted to abietyl compounds in general, it is of especial advantage in connection with abietyl compounds in which the molecule has an oxygen-containing substituent at the 1-position.

With respect to the stabilized material to be added, this addition ingredient may be prepared in any one of a variety of ways, for instance, by disproportionation or by hydrogenation. The partially aromatized type of addition ingredient is particularly effective, especially when prepared in the presence of a sulfurous treating agent, for example, in accordance with copending application of Nicholas L. Kalman, Serial No. 493,442, filed July 3, 1943, now Patent 2,395,278, (disclosing $SO_2$ heat treatment of abietyl compounds to reduce the unsaturation thereof).

Illustrative examples of stabilized addition ingredients which may be employed are given just below.

A wood rosin may be treated in accordance with the process of the said patent by heating the same to a temperature of 225° C. for 4 hours while bubbling $SO_2$ through the rosin at a rate of 2% by weight per hour. This produces a rosin product having quite low unsaturation, as evidenced by a low iodine number, which, in a typical case, will be about 60 (Hübl), which compares with a Hübl iodine number of a typical untreated wood rosin at about 134. $SO_2$ stabilization may be effected over a wide range of temperatures extending from about 180° C. to about 350° C., and the rate of passage of $SO_2$ may also be varied from about 1% upward, although 10% is usually even more than required.

In accordance with another example, a gum rosin is treated with about 7% of sulfur, the mixture being heated at a temperature of from 200° C. to 215° C. for 3 hours. This also yields a highly stable product having low unsaturation, which is eminently suited to be employed as an addition ingredient in accordance with the present invention. Such a sulfur stabilized product in a typical case will have a Hübl iodine number of about 40, as compared with an iodine number of about 152 for the untreated gum rosin. Sulfur stabilization may be effected over a wide range of temperatures extending from about 100° C. up to about 350° C., and the amount of sulfur may also be varied, for example from 0.5% up to 15 or 20%.

As another example a commercial rosin product known as "Staybelite" (made by Hercules Powder Company) may be used, this material comprising in major part a hydrogenated rosin acid.

Still another example of a material which may be employed as an addition ingredient is "Hyex" rosin (made by Hercules Powder Company), this product being disproportionated by employment of a heat treatment in the presence of a catalyst but without any reactive chemical.

Stabilized esters may be used, such as sulfur or $SO_2$ treated methyl or glycerol esters of acidic rosin materials, and also "Hercolyn," the methyl ester of "Staybelite" mentioned just above.

In addition to products of the type above mentioned, more or less pure stabilized abietyl compounds, such as dehydroabietic acid or its derivatives may also be utilized. Dehydroabietic acid is a partially aromatized rosin acid in which one of the three rings is aromatized.

From the foregoing it will be seen that stabilization ingredients of many different types may be utilized, a number of different examples of these being given hereinafter.

The characteristic product of the present invention is a composite material comprising two abietyl ingredients, one of which is relatively unstable or has relatively high unsaturation, and the other of which is relatively stable or has relatively low unsaturation, the second ingredient constituting only a minor portion of the total composite material, for instance from about 1% to about 20% of the first ingredient. I have found that most advantageous results are secured when employing upwards of about 2%, from 5% to about 15% being quite effective for most purposes.

In practicing the invention, all that is needed by way of treatment is to bring about a thorough dispersion of the addition ingredient in the main mass of abietyl compound to be stabilized. This may be done by powderizing the materials or melting them and mixing them. Mixing may also be effected in the presence of solvents. Liquid derivatives may be mixed in the cold, i. e., at room temperature. Homogeneity in the final product is the only important factor in connection with preparing the composite material.

In considering the foregoing it should be kept in mind that the invention is of distinct advantage for a number of reasons, including the fact that only a very small proportion of the material need be subjected to a special stabilization treatment. The cost of handling and of materials used is thereby greatly reduced as compared with application of a stabilizing treatment to the entire body of the material to be stabilized. On the other hand by employing a stabilized abietyl compound as the addition ingredient or "anti-oxidant," the basic characteristics of the abietyl compound are not altered, which is in distinct contrast with various other types of anti-oxidants heretofore proposed for use. Moreover, the stabilized addition ingredients are not of a type yielding dark reaction products upon aging or exposure to oxidizing influences, which is in contrast to many prior antioxidants which, in effect, constitute impurities in the material and which are also subject to the further disadvantage that they themselves frequently produce oxidation reaction products of dark color.

To test the oxidation resistance of various of the composite materials prepared according to the invention, as given in examples herebelow, an accelerated oxidation test was applied in a comparative manner to the abietyl compounds both with and without the stabilized addition ingredient.

This oxidation test was effected by dissolving the product in a suitable solvent and adding an oxidation catalyst such as a soluble cobalt salt. This mixture was then placed in a shaker under an initial pressure of 50 lbs. of oxygen and shaken. When oxidation occurred the pressure correspondingly dropped and tests were continued until the pressure remained constant for at least several hours. The induction period or lag preceding any noticeable oxidation was noted, and as will be seen from the examples below, in many instances the induction period was very greatly extended as compared with a product not containing the addition ingredient of this invention.

EXAMPLES

EXAMPLES 1–7

In this group of examples stabilized supplemental ingredients of various types were added to WW wood rosin, the nature of the materials and the results of the oxidation tests being indicated in Table I just below.

Table I.—WW wood rosin

| Ex. | Supplemental Ingredient | | Induction Period (hrs.) in Oxidation Test |
|---|---|---|---|
| | Type | Per cent | |
| 1 | Dehydroabietic acid | 2 | 18.0 |
| 2 | ----do---- | 5 | 21.5 |
| 3 | WW Wood Rosin heat treated with 0.5% sulfur. | 5 | 17.0 |
| 4 | WW Wood Rosin heat treated with 10% sulfur. | 5 | 20.7 |
| 5 | Rosin crystals obtained from liquid SO₂ extraction of WW Wood Rosin heat treated with 5% sulfur. | 5 | 48.0 |
| 6 | "Staybelite" Rosin—a hydrogenated rosin (Hercules Powder Co.). | 5 | 16.5 |
| 7 | "Hyex" Rosin—a disproportionated rosin (Hercules Powder Co.). | 5 | 26.0 |
| | WW Wood Rosin alone | | 2.0 |

EXAMPLE 8

In this example 10% of a stabilized WW gum rosin was added to commercial WW gum rosin. The supplemental ingredient was prepared by heating gum rosin for 3 hrs. at a temperature of 210°–215° C. in the presence of 7½% of sulfur. Upon subjection to the oxidation test, the composite material was found to have an induction period of 23 hrs. This compares with an oxidation test of WW gum rosin alone which showed an induction period of only 2 hrs.

EXAMPLES 9–13

In this group of examples various stabilized esters were added as supplemental ingredients to the methyl ester of rosin. The nature of the supplemental ingredients used in the several examples and the results of the oxidation tests are indicated in Table II just below.

Table II.—Methyl ester

| Ex. | Supplemental Ingredient | | Induction Period (hrs.) in Oxidation Test |
|---|---|---|---|
| | Type | Per cent | |
| 9 | Methyl Ester made with "Hyex" Rosin — a disproportionated rosin (Hercules Powder Co.). | 2 | 13.0 |
| 10 | ----do---- | 5 | over 96.0 |
| 11 | "Hercolyn"—a methyl ester made with "Staybelite" Rosin—a hydrogenated rosin (Hercules Powder Co.). | 5 | 22.5 |
| 12 | Methyl Ester heat treated with SO₂. | 5 | 34.0 |
| 13 | Methyl Ester heat treated with 20% sulfur. | 5 | 43.0 |
| | Methyl Ester alone | | 5.3 |

EXAMPLE 14

In this example 5% of a stabilized ester gum C was added to a commercial ester gum C. The stabilized supplemental ingredient was prepared by heat treating ester gum in the presence of about 10% of sulfur. The composite material had an induction period of 29 hrs. in the oxidation test. This compared with a similar test of ester gum alone which showed an induction period of only 1½ hrs.

I claim:

1. A method for rendering a readily oxidizable abietyl compound resistant to oxidation, which method comprises adding to and dispersing in the said abietyl compound from 1% to 20% of an ingredient comprising at least a substantial proportion of a compound selected from the class consisting of disproportionated abietyl compounds and hydrogenated abietyl compounds.

2. A method in accordance with claim 1 in which the abietyl compound being treated and the compound contained in the ingredient differ only in unsaturation.

3. A method for rendering resistant to oxidation an abietyl compound having an oxygen containing substituent at the 1-position, which method comprises adding to and dispersing in the said compound from 1 to 20% of an ingredient comprising at least a substantial proportion of a second abietyl compound selected from the class consisting of disproportionated abietyl compounds and hydrogenated abietyl compounds.

4. A method in accordance with claim 3 in which the first compound and the second compound differ only in unsaturation.

5. A method for rendering readily oxidizable abietyl compounds resistant to oxidation, which method comprises adding thereto and dispersing therein a minor amount of an ingredient comprising a compound selected from the class consisting of disproportionated abietyl compounds and hydrogenated abietyl compounds, the compound in the said ingredient constituting 1% to 5% of the total weight of the abietyl compound being treated and the ingredient.

6. A method for rendering abietic acid resistant to oxidation which comprises adding to and dispersing in the abietic acid to be treated from 1 to 20% of an ingredient comprising at least a substantial proportion of a compound selected from the class consisting of disproportionated abietyl compounds and hydrogenated abietyl compounds.

7. A method in accordance with claim 3 in which the said compound is disproportionated abietic acid.

8. A method in accordance with claim 3 in which the said compound is hydrogenated abietic acid.

9. A method for rendering esters of abietic acid resistant to oxidation which comprises adding to and dispersing in the ester to be treated from 1 to 20% of an ingredient comprising at least a substantial proportion of a compound selected from the class consisting of disproportionated abietyl compounds and hydrogenated abietyl compounds.

10. A method in accordance with claim 9 in which the said compound is a disproportionated abietyl ester.

11. A method in accordance with claim 9 in which the said compound is a hydrogenated abietyl ester.

12. A method in accordance with claim 9 in which the said compound differs from the abietyl ester being treated only in unsaturation.

13. A method for rendering readily oxidizable rosin resistant to oxidation, which method comprises adding to and dispersing in the rosin from 1 to 20% of an ingredient comprising at least a substantial proportion of a substance selected from the class consisting of disproportionated abietyl compounds and hydrogenated abietyl compounds.

14. A method in accordance with claim 13 in which the substance is disproportionated rosin.

15. A method in accordance with claim 13 in which the substance is hydrogenated rosin.

SEYMOUR YOLLES.

REFERENCES CITED

The following references are of record in the file of this patent:

UNITED STATES PATENTS

| Number | Name | Date |
|---|---|---|
| 1,881,907 | Palmer | Oct. 11, 1932 |
| 1,931,226 | Humphrey | Oct. 17, 1933 |
| 1,980,367 | Auer | Nov. 13, 1934 |
| 2,142,039 | Abrams | Dec. 27, 1938 |
| 2,311,200 | Auer | Feb. 16, 1943 |

OTHER REFERENCES

J. A. C. S., vol. 61, pp. 247–249, Feb. 1939; ibid., p. 1230, May 1939.

Comptes Rendus, 213, 793–796, Dec. 1941.

Protective and Decorative Coatings, Mattiello, vol. 1. John Wiley, 1941, pages 187 and 208.